United States Patent
Yang et al.

(10) Patent No.: US 8,902,415 B2
(45) Date of Patent: Dec. 2, 2014

(54) LUMINOUS INTENSITY TEST DEVICE

(71) Applicants: Fu Tai Hua Industry (Shenzhen) Co., Ltd., Shenzhen (CN); Hon Hai Precision Industry Co., Ltd., New Taipei (TW)

(72) Inventors: Chun-Yan Yang, Shenzhen (CN); Yu-Cui Zhou, Shenzhen (CN); Na-Na Zhai, Shenzhen (CN); Qiao-Na Sheng, Shenzhen (CN); Xiao-Jun Chen, Shenzhen (CN); Jiang-Feng Shan, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/886,938

(22) Filed: May 3, 2013

(65) Prior Publication Data

US 2013/0301039 A1 Nov. 14, 2013

(30) Foreign Application Priority Data

May 14, 2012 (CN) .......................... 2012 1 0147561

(51) Int. Cl.
| | |
|---|---|
| *G01J 1/00* | (2006.01) |
| *G01J 1/42* | (2006.01) |
| *G01J 1/44* | (2006.01) |
| *G01J 1/02* | (2006.01) |
| *G01J 3/02* | (2006.01) |
| *G01J 3/50* | (2006.01) |

(52) U.S. Cl.
CPC .................. *G01J 1/44* (2013.01); *G01J 1/0219* (2013.01); *G01J 3/0264* (2013.01); *G01J 3/505* (2013.01); *G01J 2001/4247* (2013.01)
USPC .............................. 356/213; 356/218; 356/222

(58) Field of Classification Search
CPC ........... G01J 1/4257; G01J 2001/4247; G02B 26/02; G03B 21/2053; G03B 21/208; F21Y 2101/02; F21Y 2103/00; F21Y 2105/001; F21Y 2105/00
See application file for complete search history.

(56) References Cited

U.S. PATENT DOCUMENTS

| | | | |
|---|---|---|---|
| 5,914,777 A * | 6/1999 | Imura ............................ | 356/121 |
| 2008/0215279 A1* | 9/2008 | Salsbury et al. ............... | 702/107 |
| 2009/0051711 A1* | 2/2009 | Evanicky et al. .............. | 345/690 |

* cited by examiner

*Primary Examiner* — Michael P Stafira
(74) *Attorney, Agent, or Firm* — Novak Druce Connolly Bove + Quigg LLP

(57) ABSTRACT

A luminous intensity test device includes an optical frequency converter, a display, and a processor. The optical frequency converter selectively converts at least a portion of light emitted by a light source into a digital signal. The display displays a color selection interface. The processor processes the digital signal and obtains the luminous intensity. When a tester inputs a color parameter into the color selection interface via an input device, the optical frequency converter converts a kind of light to the digital signal and then the processor processes the digital signal to obtain a luminous intensity and display the luminous intensity on the display.

20 Claims, 3 Drawing Sheets

LUMINOUS INTENSITY TEST DEVICE

BACKGROUND

1. Technical Field

The present disclosure relates to a luminous intensity test device.

2. Description of Related Art

An optical multi-channel analyzer (OMA) is used for analyzing color and luminous intensity of a light emitting diode (LED). However, the OMA is big in size, and the OMA is expensive.

Therefore, what is needed is a means to overcome the above described shortcoming.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will be made to the drawings to describe various embodiments.

Figure 1:
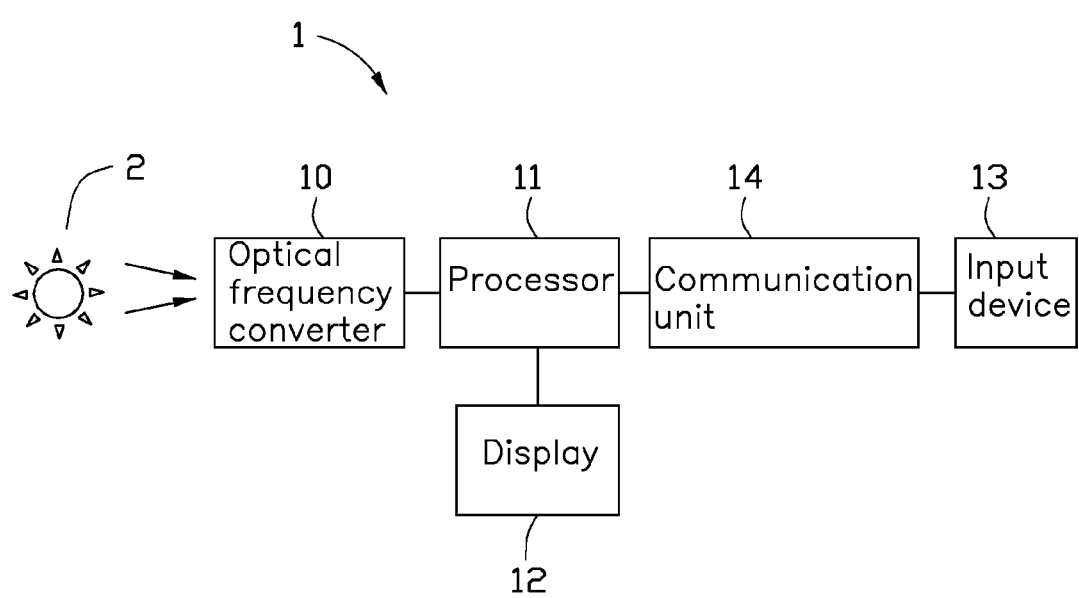
FIG. 1 is a block diagram of a luminous intensity test device comprising an optical frequency converter according to an exemplary embodiment of the present disclosure.

FIG. 1 is a block diagram of a luminous intensity test device 1 according to an exemplary embodiment of the present disclosure. The luminous intensity test device 1 tests a luminous intensity of a light source 2. The light source 2 emits light comprising at least two kinds of color. The luminous intensity test device 1 includes an optical frequency converter 10, a processor 11, a display 12, an input device 13, and a communication unit 14. The optical frequency converter 10 converts the light emitted by the light source 2 into a digital signal. Different colors and luminous intensity correspond to different frequencies of the digital signals.

The display 12 displays a color selection interface. In one embodiment, the color selection interface is a particular graphic user interface (GUI) of the luminous intensity test device 1, which is used to select a color parameter (e.g., color kind) by a tester. In one example, the tester can input the color parameter into the color selection interface via the input device 13. The communication unit 14 receives the color parameter and transmits the color parameter to the processor 11. The processor 11 controls the optical frequency converter 10 converts the light emitted by the light source 2 into the digital signal. The processor 11 processes the digital signal and obtains the luminous intensity from the digital signal, and the processor 11 displays the luminous intensity on the display 12. In the embodiment, the input device 13 may be a keyboard.

In another embodiment, the display 12 is a touch screen, the tester can select the color parameter via the touch screen, and the input device 13 could be omitted.

Figure 2:
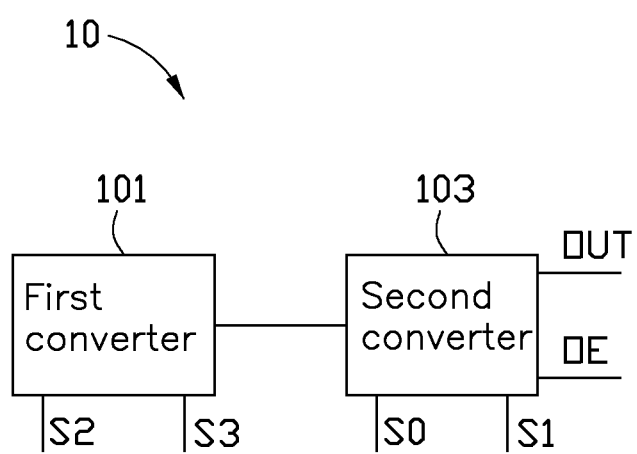
FIG. 2 is a block diagram of the optical frequency converter of FIG. 1.

FIG. 2 is a block diagram of the optical frequency converter 10. The optical frequency converter 10 includes a first converter 101 and a second converter 103. The first converter 101 is a photoelectric converter to convert the light into an analog signal, and the second converter 103 is an A/D converter to convert the analog signal into the digital signal. The first converter 101 includes two light-wave selection pins S2 and S3. Each of the two light-wave selection pins S2 and S3 receives a logic high signal (e.g., "1") or a logic low signal (e.g., "0"). The second converter 103 includes two control pins S0 and S1, a frequency enable pin OE, and an output pin OUT. The two control pins S0 and S1 adjust a frequency of the digital signal. The frequency enable pin OE controls whether the optical frequency converter 10 outputs the digital signal or not. The second converter 103 converts the analog signal output by the first converter 101 into the digital signal and then outputs the digital signal via the output pin OUT. In the embodiment, the optical frequency converter 10 is a TCS230 optical frequency converter made by TAOS.

In the embodiment, the first converter 101 includes a plurality of photodiodes. The plurality of photodiodes are divided into four kinds (e.g., red, blue, green, and white), and a number of each kind of photodiode is the same. In the embodiment, the number of each kind of photodiode is sixteen. The red photodiodes sense and convert red light in the light from the light source into a first current, the blue photodiodes sense and convert blue light in the light from the light source into a second current, and the green photodiodes sense and covert green light in the light from the light source into a third current. The light from the light source 2 is capable of penetrating the white photodiodes. The first converter 101 receives the color parameter selected by the tester via the two light-wave selection pins S2 and S3. Table 1 shows a relationship between the selected color photodiode and the logic signal assemble of S2 and S3. When both of the two light-wave selection pins S2 and S3 receive the logic low signal, the red photodiodes are selected and the red photodiodes convert the red light into a first analog signal. When the light-wave selection pin S2 receives the logic low signal and the light-wave selection pin S3 receives the logic high signal, the blue photodiodes are selected and the blue photodiodes convert the blue light into a second analog signal. When the light-wave selection pin S2 receives the logic high signal, and the light-wave selection pin S3 receives the logic low signal, the plurality of photodiodes are free, all kinds of light from the light source 2 could penetrate the white photodiodes. When both of the light-wave selection pin S2 and the light-wave selection pin S3 receive the logic high signal, the green photodiodes are selected and the green photodiodes convert the green light into a third analog signal.

TABLE 1

| S2 | S3 | Photodiode color |
|----|----|------------------|
| 0  | 0  | Red              |
| 0  | 1  | Blue             |
| 1  | 0  | No               |
| 1  | 1  | Green            |

Figure 3:
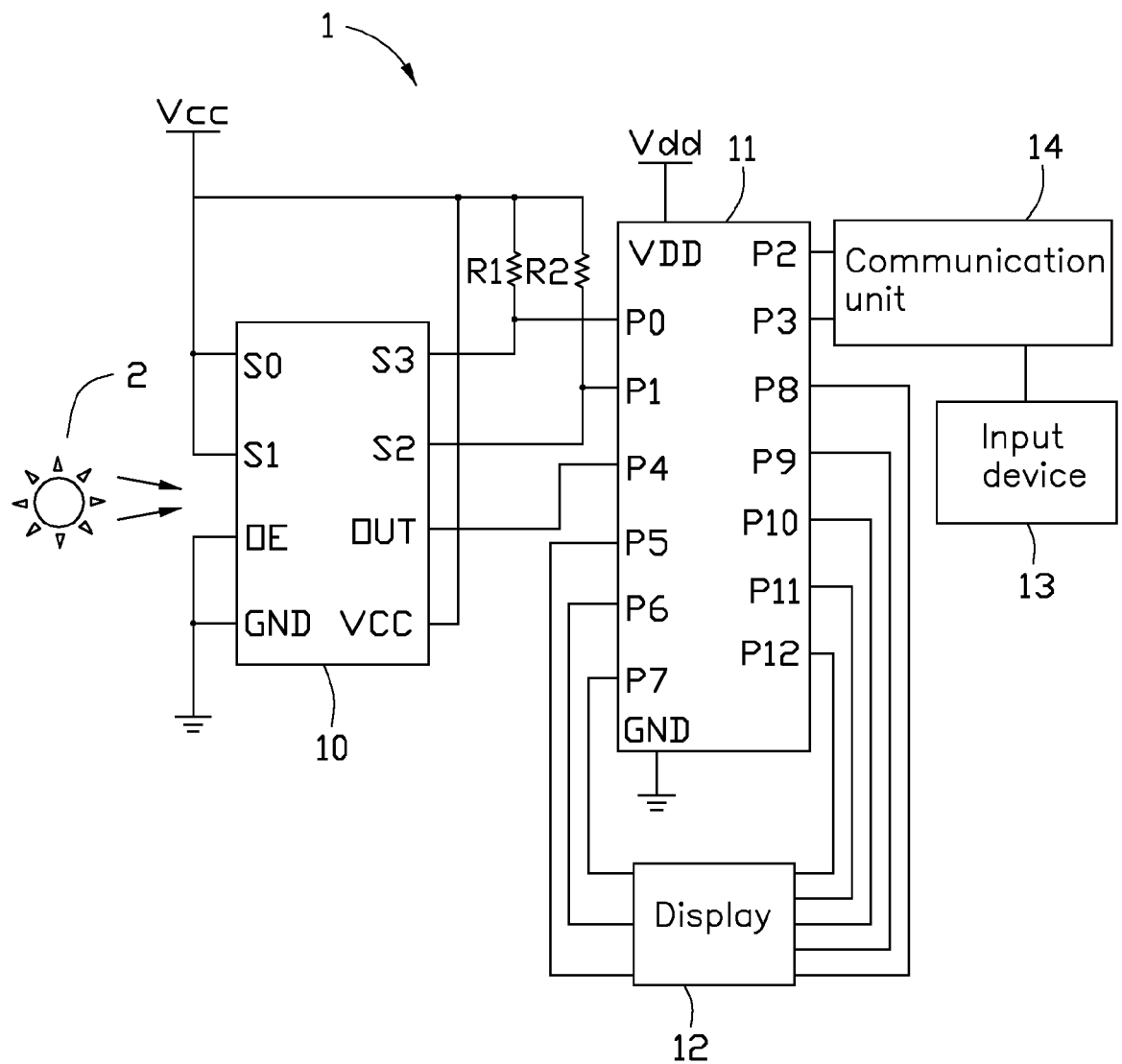
FIG. 3 is a detailed circuit diagram of the luminous intensity test device of FIG. 1.

FIG. 3 is a detailed circuit diagram of the luminous intensity test device 1. The processor 11 includes a ground pin "GND", a power pin "VDD", and thirteen I/O pins "P0, P1, P2, P3, P4, P5, P6, P7, P8, P9, P10, P11, and P12". The power pin "VDD" is electrically connected to an external power source Vdd. In the embodiment, the processor is a MCS-51 MCU. The display 12 includes eight I/O pins at least.

The optical frequency converter 10 further includes a ground pin "GND" and a power pin "VCC", and the power pin "VCC" is connected to an external power source Vcc. The light-wave selection pins S2 and S3 connect to I/O pins "P1 and P0" of the processor 11, respectively. The output pin OUT is electrically connected to the I/O pin "P4". The I/O pins "P5, P6, P7, P8, P9, P10, P11, and P12" of the processor 11 are electrically connected to the display 12. The I/O pins "P2 and P3" are electrically connected to the input device 13 via the communication unit 14.

In operation, the tester inputs the color parameter to the color selection interface via the input device 13. The processor 11 receives the color parameter. The processor 11 generates the logic signals and outputs the logic signals to the two light-wave selection pins S2 and S3 according to the color parameter. Based on the logic signals, one kind of photodiode of the first converter 101 is selected, and the selected kind of photodiode converts the light emitted by the light source 2 into the analog signal, then the second converter 103 converts the analog signal into the digital signal. The processor 11 then receives and processes the digital signal and obtains luminous intensity and then displays the luminous intensity on the display 12.

The luminous intensity test device 1 further includes a first resistor R1 and a second resistor R2. The light-wave selection pin S2 is electrically connected to the external power source Vcc via the second resistor R2. The light-wave selection S3 is electrically connected to the external power source Vcc via the first resistor R1. The first resistor R1 and the second resistor R2 suppress a surge current from the external power.

In summary, the luminous intensity test device includes an optical frequency converter (e.g., TCS 230) and a processor (e.g., MCS-51 MCU) to obtain luminous intensity of monochromatic light of the light source, thus the luminous intensity test device is smaller than the OMA in size, and the cost of the luminous intensity test device is cheaper.

It is to be understood that even though numerous characteristics and advantages of the present embodiments have been set forth in the foregoing description, with details of the structures and functions of the embodiments, the disclosure is illustrative only; and changes may be in detail, especially in the matters of arrangement of parts within the principles of the embodiments to the full extent indicated by the broad general meaning of the terms in which the appended claims are expressed.

What is claimed is:

1. A luminous intensity test device, comprising:
an optical frequency converter receiving light emitted by a light source and selectively converting at least a portion of the light into a digital signal, wherein the optical frequency converter comprises a photoelectric converter to convert the light into an analog signal, the photoelectric converter comprises a plurality of photodiodes which are divided into a plurality of kinds and two light-wave selection pins, each of the two light-wave selection pins receives a logic high signal or a logic low signal to select one kind of photodiodes to convert the light into the analog signal;
a color selection interface displaying an interface to receive a color parameter;
a processor receiving the color parameter via the color selection interface, controlling the optical frequency converter to convert the light into the digital signal based on the color parameter, processing the digital signal output from the optical frequency converter and obtaining a luminous intensity; and
a display displaying the color selection interface and the obtained luminous intensity.

2. The luminous intensity test device of claim 1, the color parameter is input into the color selection interface via an input device.

3. The luminous intensity test device of claim 2, further comprising a communication unit electrically connected to the input device and the processor, the communication unit receiving the color parameter and transmitting the color parameter to the processor.

4. The luminous intensity test device of claim 1, wherein the optical frequency converter further comprises a second converter, the second converter is an A/D converter to convert the analog signal into the digital signal.

5. The luminous intensity test device of claim 1, wherein a number of each kind of photodiodes is same.

6. The luminous intensity test device of claim 4, wherein the second converter comprises two control pins to adjust a frequency of the digital signal.

7. The luminous intensity test device of claim 6, wherein the processor comprises a plurality of I/O pins, each of the light-wave selection pin is connected to one I/O pin; the two control pins are electrically connected to an external power source.

8. The luminous intensity test device of claim 7, wherein the luminous intensity test device further comprises a first resistor and a second resistor to the two light-wave selection pins to suppress a surge current from the external power source.

9. A luminous intensity test device, comprising:
an optical frequency converter receiving light emitted by a light source and selectively converting at least a portion of the light into a digital signal, wherein the optical frequency converter comprises a photoelectric converter to convert the light into an analog signal, the photoelectric converter comprises a plurality of photodiodes which are divided into a plurality of kinds and two light-wave selection pins, each of the two light-wave selection pins receives a logic high signal or a logic low signal to select one kind of photodiodes to convert the light into the analog signal;
a touch screen displaying a color selection interface to receive a color parameter; and
a processor receiving the color parameter via the color selection interface, controlling the optical frequency converter to convert the light into the digital signal based on the color parameter, processing the digital signal output from the optical frequency converter and obtaining a luminous intensity to display on the touch screen.

10. The luminous intensity test device of claim 9, the color parameter is input into the color selection interface via the touch screen.

11. The luminous intensity test device of claim 9, further comprising a communication unit electrically connected to the touch screen and the processor, the communication unit receiving the color parameter and transmitting the color parameter to the processor.

12. The luminous intensity test device of claim 9, wherein the optical frequency converter further comprises a second converter, the second converter is an A/D converter to convert the analog signal into the digital signal.

13. The luminous intensity test device of claim 9, wherein a number of each kind of photodiodes is same.

14. The luminous intensity test device of claim 12, wherein the second converter comprises two control pins to adjust a frequency of the digital signal.

15. The luminous intensity test device of claim 14, wherein the processor comprises a plurality of I/O pins, each of the light-wave selection pin is connected to one I/O pin; the two control pins are electrically connected to an external power source.

16. The luminous intensity test device of claim 15, wherein the luminous intensity test device further comprises a first resistor and a second resistor connected to the two light-wave selection pins to suppress a surge current from the external power source.

17. The luminous intensity test device of claim 1, wherein the plurality of photodiodes comprise red photodiodes, blue photodiodes, and green photodiodes; and the red photodiodes sense and convert red light in the light from the light source into a first analog signal, the blue photodiodes sense and convert blue light in the light from the light source into a second analog signal, and the green photodiodes sense and covert green light in the light from the light source into a third analog signal.

18. The luminous intensity test device of claim 17, wherein when both of the two light-wave selection pins receive the logic low signal, the red photodiodes are selected and the red photodiodes convert the red light into the first analog signal; when one of two the light-wave selection pins receives the logic low signal and the other light-wave selection pin receives the logic high signal, the blue photodiodes are selected and the blue photodiodes convert the blue light into the second analog signal; and when both of the light-wave selection pin and the light-wave selection pin receive the logic high signal, the green photodiodes are selected and the green photodiodes convert the green light into the third analog signal.

19. The luminous intensity test device of claim 9, wherein the plurality of photodiodes comprise red photodiodes, blue photodiodes, and green photodiodes; and the red photodiodes sense and convert red light in the light from the light source into a first analog signal, the blue photodiodes sense and convert blue light in the light from the light source into a second analog signal, and the green photodiodes sense and covert green light in the light from the light source into a third analog signal.

20. The luminous intensity test device of claim 19, wherein when both of the two light-wave selection pins receive the logic low signal, the red photodiodes are selected and the red photodiodes convert the red light into the first analog signal; when one of two the light-wave selection pins receives the logic low signal and the other light-wave selection pin receives the logic high signal, the blue photodiodes are selected and the blue photodiodes convert the blue light into the second analog signal; and when both of the light-wave selection pin and the light-wave selection pin receive the logic high signal, the green photodiodes are selected and the green photodiodes convert the green light into the third analog signal.

* * * * *